United States Patent [19]

Van De Kop et al.

[11] Patent Number: 4,882,676
[45] Date of Patent: Nov. 21, 1989

[54] METHOD AND APPARATUS FOR RATING BILLIARD SHOTS AND DISPLAYING OPTIMAL PATHS

[76] Inventors: Andrew R. Van De Kop; Franz Van De Kop, both of 925 Fulwar Skipwith, Rte. 3, Baton Rouge, La. 70808

[21] Appl. No.: 242,159

[22] Filed: Sep. 9, 1988

[51] Int. Cl.$^4$ .............................................. G06F 15/44
[52] U.S. Cl. ................................... 364/410; 364/516; 273/14
[58] Field of Search ....................... 364/410, 411, 516; 273/2, 14

[56] References Cited

U.S. PATENT DOCUMENTS

| | | | |
|---|---|---|---|
| 3,120,956 | 2/1964 | Burgess | 273/54 |
| 3,463,593 | 7/1969 | Horan | 273/14 |
| 3,466,038 | 9/1969 | Hill | 273/14 |
| 3,618,944 | 11/1971 | Myers | 273/14 |
| 4,120,494 | 10/1978 | Roe | 273/2 |
| 4,183,523 | 1/1980 | Hecht | 273/22 |
| 4,545,576 | 10/1985 | Harris | 364/411 X |
| 4,664,376 | 5/1987 | Gray | 364/411 X |
| 4,688,796 | 7/1987 | Wright | 273/14 X |

OTHER PUBLICATIONS

"Real Time Imaging on the IBM PC AT", sales brochure, Matrox Electronic Systems Ltd., Dorval, Quebec.

"Visilog Image Processing Software", sale brochure, Noesis Vision Inc., St. Laurent, Quebec.

*Primary Examiner*—Jerry Smith
*Assistant Examiner*—Steven Kibby
*Attorney, Agent, or Firm*—Arnold, White & Durkee

[57] ABSTRACT

A billiard ball tracking system is disclosed. According to the present invention, the system may be used to either instruct a player to improve his playing capabilities or to rate the comparative skills of two competing players. The system according to the present invention is provided with means to indicate a selected layout of cue ball and object balls and means for indicating a preferred shot. Once a player has designated a particular object ball and the desired movement of the ball on the playing surface of a pool table, the system will calculate the optimum paths of cue ball and playing ball in order for the playing ball to be pocketed as designated by the player. In the most preferred embodiment of the present system, the system will, through the use of a laser tracking system, accurately track the changing position of all of the playing balls on the playing surface of the pool table. The system is also capable of instructing a player as to the proper line of attach of a cue ball to a called playing ball by projecting a laser-generated image directly onto the pool table to outline the proper path of cue ball to called playing ball. The system according to the present invention may also include recording means to record a preceding series of shots or an entire match to be replayed later at the convenience of the pool player or players.

8 Claims, 2 Drawing Sheets

METHOD AND APPARATUS FOR RATING BILLIARD SHOTS AND DISPLAYING OPTIMAL PATHS

FIELD OF THE INVENTION

The present invention relates to pocket billiards and, specifically, to a system for tracking the movement of balls on a billiards table in order to comparatively rate the ability of two players, or alternatively to instruct a player to improve his playing ability.

BACKGROUND OF THE INVENTION

The game of pocket billiards, or "pool", has been a popular recreational activity for many years. Many different games have been developed around the game of billiards or "pool". Pool is a game in which one or more players move a plurality of balls about a planar surface on a pool or billiards table in order to either position the balls on the table or "pocket" the balls within one of several "pockets" provided about the periphery of the playing surface of the table.

"Pool" or "billiards" can be played by one or more players. When one person plays "pool" or "billiards" (the two terms will hereinafter be used interchangeably), the person is most often playing to improve his skill at the game. When two players play, they most often compete against one another. In competition, players most commonly compete against one another in order to determine which player is capable of making the most, and most difficult, shots resulting in the pocketing of balls. When "billiards" is played, players generally compete to determine who is most able to position particular balls within specified areas on the table.

Therefore, in order to play pool, billiards, or pocket billiards, a player must accurately position "object" balls on the table by striking the object balls with a single cue ball which is, in turn, struck by the player with a "cue stick". Players are rated according to their ability to accurately position balls within "pockets" positioned about the surface of the table or within specified regions on the table.

Over the last several years, several of the more popular games in pocket billiards involve shooting the object balls into the pockets in a predetermined sequence. For example, the game of "9-ball" requires that each player pocket the object balls in numerical order, starting with the 1-ball and ending with the 9-ball. Not only is it important to be able to pocket the object balls, it is equally important to strike or "shoot" the cue ball with a "cue stick" so that the cue ball will come to rest in a location which will facilitate the pocketing of the next ball in the sequence. This skill, which is also required in the classical game of "billiards", is called the art of "getting in shape." That is, the player must leave the cue ball in a position so that it is lined up for the next shot in sequence. This skill requires much more practice beyond the simple ability of being able to strike an object ball with a cue ball so as to move or pocket it. Further, players rate themselves against one another by determining who is best able to strike the object balls with the cue ball so as to make comparatively more difficult shots.

SUMMARY OF THE INVENTION

The present invention relates generally to a system of monitoring the changing position of pool balls on the playing surface of a pool table and either recording the planned and subsequent movement of the balls in order to assess points according to the difficulty of the shot achieved; or, in the alternative, to calculate and project the ideal line of impact between a cue ball and an object ball based upon the player's selection of a shot. More particularly, the present invention relates to a system and apparatus wherein the movement of cue and object balls on the pool table may be predetermined ball by ball in order to train a pool player; or, in the alternative, to assess points to a particular shot called, and made, in order to competitively rate the play of two players.

In the instructional sense, the apparatus and system according to the present invention will aid a pool player in improving his shot-making capability. Particularly, the novel and unique apparatus and system according to the present invention will help a pool player practice the art of properly locating the cue ball at the end of a shot so as to set up subsequent shots. The system includes, in this instructional sense, means for indicating both the preferred path of the cue ball during the "called" shot, and the preferred final location of the cue ball after the shot has been made. Further, in the instructional mode of the present invention, the system will, after completion of a first shot, illustrate a preferred second shot. The system will project the ideal sequence of the called shot by projecting the optimum ball movement path on the playing surface so that the player may practice his ability to set up subsequent shots.

In the competitive mode, the system according to the present invention will rate the shot-making capability of competing players. In this sense, a player will indicate his pre-called shot on a touch-sensitive computer terminal. Thereafter, the apparatus according to the present invention will assess a difficulty rating to the indicated shot in order to subsequently assess points to the player if the shot is made. In this manner, the complete play of the players is monitored by the system and points are assessed as shots are made according to the difficulty of the shot. If a particular player misses a shot, points are deducted from the overall running total for that player. At the end of the game, the system indicates which player has accumulated the greatest number of points (the point total being based upon the number of difficulty of the shots made).

An apparatus according to the present invention will include position-indicating means, for indicating an initial position of the cue ball and object balls on the table. The initial placement of the balls may be determined by the particular game being practiced or played; or may be determined by the player's desire to practice a sequence of shots given any appropriate positioning of the object balls. Players may also compete against one another by setting up predetermined, and difficult, shots in order to rate the players' ability to make difficult and challenging pool shots.

The apparatus according to the present invention will further include a shot-indicating means for indicating the preferred line of travel of the cue and called object ball given the called shot. The shot-indicating means will illustrate a preferred path of the cue ball for striking an object ball during the called shot; and will further illustrate a preferred final location of the cue ball at the end of the shot in order to "get the player in shape" for subsequent shots.

The apparatus may further include a sequencing means for causing the shot-indicating means to indicate a sequence of shots; each shot in the called sequence being indicated subsequent to completion of the prior shot so that the object balls are struck in a preferred sequence. In this manner, the system according to the present invention may either train players to choose the correct and logical sequence of shooting pool balls, or may require competing players to both shoot a predetermined sequence of shots to accurately rate the pool-playing ability of the competing players.

According to the present invention, the apparatus may further include recording means for recording the movement of the cue ball and object balls during play. In this particular embodiment of the present invention, playback means, for illustrating the previous movement of the cue and object balls, will also be included to project upon the pool table or a television or computer screen the play which has been recorded. In this particular embodiment of the present invention, a pool player may either be trained by observing the errors which he has just committed; or competing players may recall and relive the previous series of shots, much the same way as other sports fans enjoy "instant replay."

Finally, a path-indicating means may be used to indicate the path followed by the cue ball during previous shots. The recording means, playback means, and path-indicating means may be used by the player, or players, to view the paths followed by the cue ball; or, in the alternative, the action of the balls during the previous shots so that players may learn from their past mistakes, or simply enjoy the previously completed play.

DETAILED DESCRIPTION OF THE PREFERRED EMBODIMENTS

Figure 1:
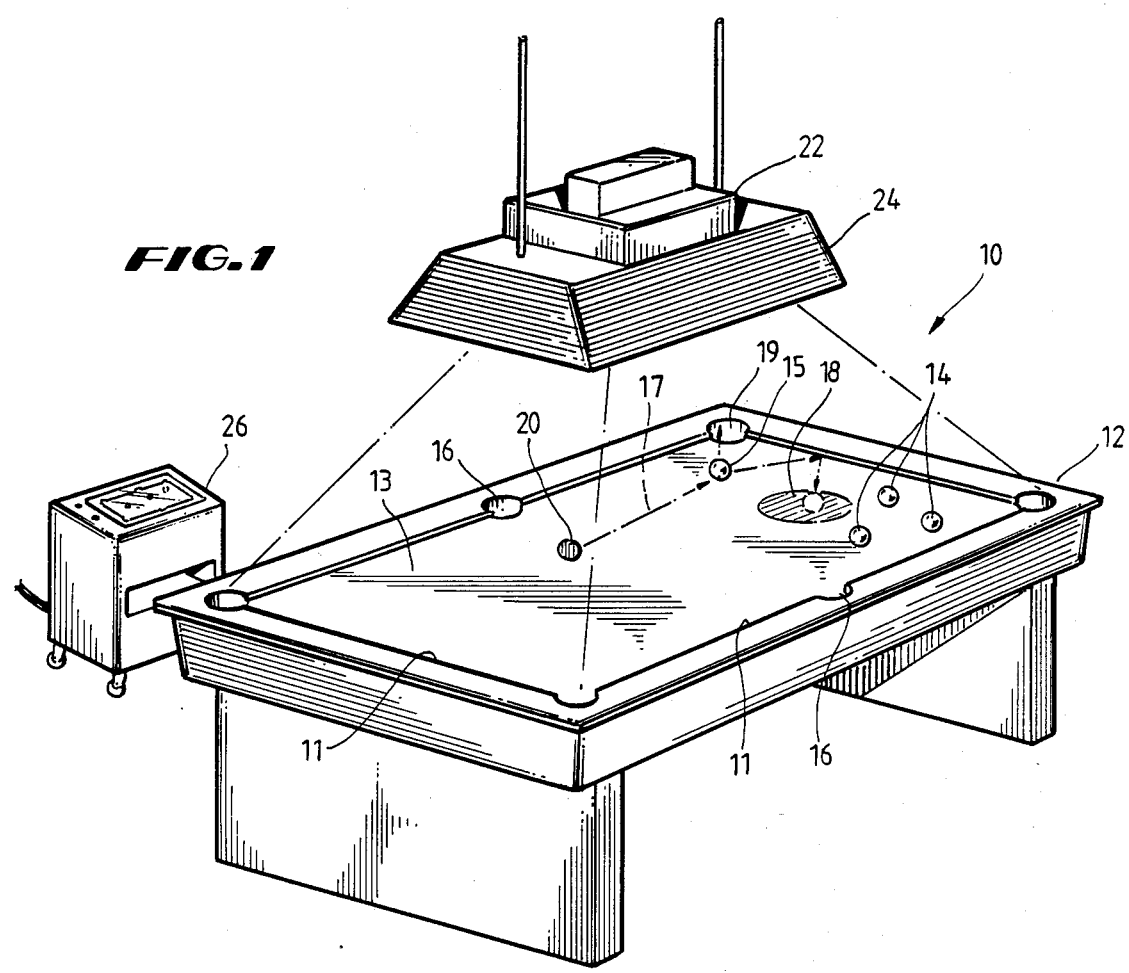
FIG. 1 is an isometric view of a pool ball monitoring system according to the present invention in use on a standard size competitive pool table.

Referring now to FIG. 1, a billiards tracking system, in use over a conventional pool table, is shown generally at 10. In accordance with the present invention, a ball tacking system is attached to a conventional pool lamp 24 suspended above a conventional six-pocket pool table 12. In accordance with the present invention, any conventional pool table 12 may be used, as the pool ball tracking system may be adapted to work with any pool table. The pool ball tracking system may be either a video-based system or a laser based system.

In accordance with the most preferred embodiment of present invention, the laser pool ball tracking system 22, attached to the overhead pool light 24, will scan the playing surface 13 of a conventional pool table 12 in order to accurately determine the location of the cue ball 20 and all object balls shown generally at 14. Either before or after the scan is made, the system may be directed to either the instructional or competitive mode as described more completely below. During the scanning operation, the unit 22 will also accurately determine the location of each pocket 16 located about the periphery of the standard pool table 12. Alternatively, the location of the pockets 16 may be programmed into a computer unit by entering the location of the pockets 16 according to the coordinates of the pockets 16 in an "X" and "Y" axis grid system used by the system 22.

Thereafter, and still referring to FIG. 1, the player may select, or "call", a shot by tracing the line of the shot on a touch-sensitive computer screen attached to a control unit, shown generally at 26.

While in the instructional mode, the unit 22 will scan the playing surface 13 of the pool table 12 in order to precisely locate the cue ball 20 and the selected object ball, for example object ball 15. While in the instructional mode, the laser ball tracking unit 22 will calculate the precise line which the cue ball 20 must take in order to strike the selected object ball 15 to pocket the ball 15 in the pocket 19 previously selected by the player.

In the most preferred embodiment of the present invention, while in the instructional mode, the unit 22 will thereafter accurately prescribe, by laser projection, the correct line that the cue ball 20 must take in order to strike the selected object ball 15 to pocket it. In this preferred embodiment, the unit 22 will project a laser-generated image or line directly on the playing surface 13 of the pool table 12.

Referring still to FIG. 1, while in the instructional mode, the laser tracking unit or system 22 will also calculate the location where the cue ball 20 should end up after the selected shot has been completed in order to facilitate a series of subsequent shots, resulting in the pocketing of the remaining object balls 14. As is shown in FIG. 1, the tracking unit 22 will also prescribe a region (shown generally at 18) where the cue ball 20 should end up after completion of the shot. As indicated above, the unit 22 will also project, by laser image, this region 18 directly onto the playing surface 13 of the pool table 12. In this manner, the player will not only be instructed as to the correct line of travel that the cue ball should take given the selected shot, but will also be instructed as to the proper end position of the cue ball 20 in order to "get in shape" for the next shot.

In further reference to FIG. 1, the tracking unit 22 attached to the overhead pool light fixture 24 may also be used in a competitive mode. While in the competitive mode, the unit 22, as indicated above, will accurately scan the playing surface 13 of the pool table 12 in order to precisely locate the position of the cue ball 20 and all object balls shown generally at 14 and 15. Thereafter, the competing players will "call their shots" in turn and prescribe those shots on the face of the touch-sensitive computer screen shown on the control module at 26. While in either the competitive or instructional mode, the unit 22, after completing the scan of the playing surface 13 of the pool table 12, will display on the touch-sensitive computer screen 26 an image of the pool table and a depiction of the exact location of each of the object balls and cue ball on the table.

In one preferred embodiment, the unit 22 will be further provided with a video camera which will relay the play of the table to a recorder, and display the play as it happens on a stand-alone television screen.

When "calling the shot", all a player need do is trace out the "call of the shot" on the touch-sensitive computer screen by indicating which ball will be struck by the cue ball and which rails 11 will be used in order to pocket the selected ball in a particular pool pocket 19. Thereafter, the unit 22 will indicate the selected shot on the computer screen by prescribing lines indicating the movement of the cue and object balls according to the called shot. In the competitive mode, the unit 22, by simple physics calculations, will calculate all the lines of "attack" that the cue ball 20 may take before it contacts the selected object ball 15 in order to pocket the object ball 15 in the selected billiard pocket 19. Thereafter, the unit 22 will calculate the angular variation between the two extreme lines of attack that the cue ball 20 may take before it contacts selected object ball 15 in order to pocket the selected object ball 15 in the called pocket.

Thereafter, the unit 22 will then assess a point value indicating the difficulty of the shot, which may be based upon the angular displacement. For example, the unit 22 may simply multiply the reciprocal of the angular variation in lines of attack by a factor of 100 in order to assess a point value corresponding to the difficulty of the shot. Therefore, if the cue ball 20 is a relatively long distance away from the selected object ball 15, and if the selected object ball 15 is at a position on the playing surface 13 of the pool table 12 so that only relatively few lines of attack may be followed by the cue ball 20 to strike the object ball 15 in order to pocket it in the selected pocket 19, the angular variation will be slight. The computer will assess a correspondingly greater point value if the shot is completed.

In accordance with the preferred embodiment of the present invention, the tracking unit 22 will conduct a laser scan after each shot. This will be done in order to determine: (a) if the previous shot was successful and the ball pocketed; and (b) the new position of each of the object balls 14 and cue ball 20 on the playing surface 13 of the table 12.

Figure 2:
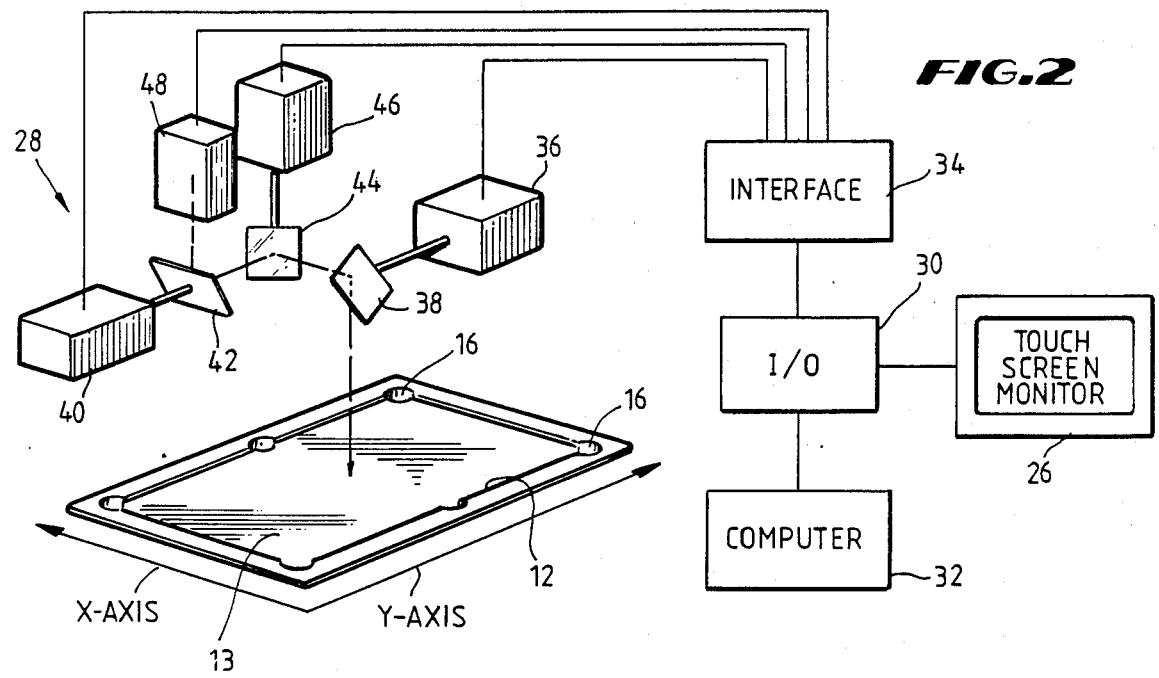
FIG. 2 is a block diagram showing several of the components used in one preferred embodiment of the present invention.

Referring now to FIG. 2, a block diagram describing several of the components of a laser pool ball tracking apparatus according to the present invention are shown. As seen in FIG. 2, a tracking unit according to the present invention may comprise a low-wattage laser generator 40, a one-way mirror 42 positioned directly in front of the laser generator 40, a ball reflection receiver 48, and "X" and "Y" axis units 36, 46, respectively, each with its own respective mirror surface 38 and 44.

The X-axis unit 36 and the Y-axis unit 46 each comprise a stepping motor which is used to direct corresponding reflective surfaces 38 and 44 according to the commands of a computer unit 32. A separate encoder is used to direct the motors to position the reflective surfaces in order to either determine the location of the object balls 14 and cue ball 20, or to direct the laser light from laser generator 40 to project a laser image on the playing surface 13 of the pool table 12 to direct the player's shot. In the most preferred embodiment of the present invention, each of the X and Y axis units is comprised of a 24,000-step encoder which matches a 24,000-step per rotation motor. These motors and their respective encoders are used to position the reflective surfaces 38 and 44 in accordance with signals generated in the computing unit 32 which are subsequently transmitted to the respective encoders.

Figure 5:
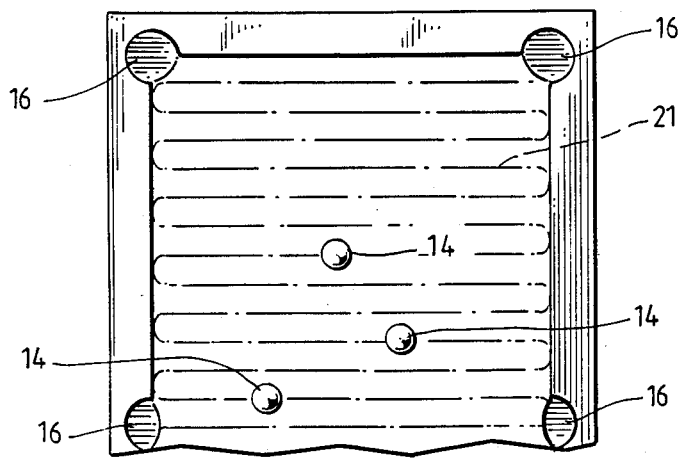
FIG. 5 is a partial plan view and depiction of the grid system used to locate and track object balls in accordance with the present invention.

For example, when the unit 22 is scanning the playing surface 13 to determine the location of the balls 14 and 20, the computer 32 will direct the encoder and motor units of the X and Y axis units to direct the reflective surfaces 38 and 44 to create the laser scan along the grid 21 depicted in FIG. 5.

In a similar manner, the computer 32 may direct the X and Y axis encoders and motors to quickly reposition the reflective surfaces 38 and 44 in order to project a laser image on the playing surface 13 of the pool table 12 to direct the player's shot during the instructional mode of the system 10.

Figure 4:
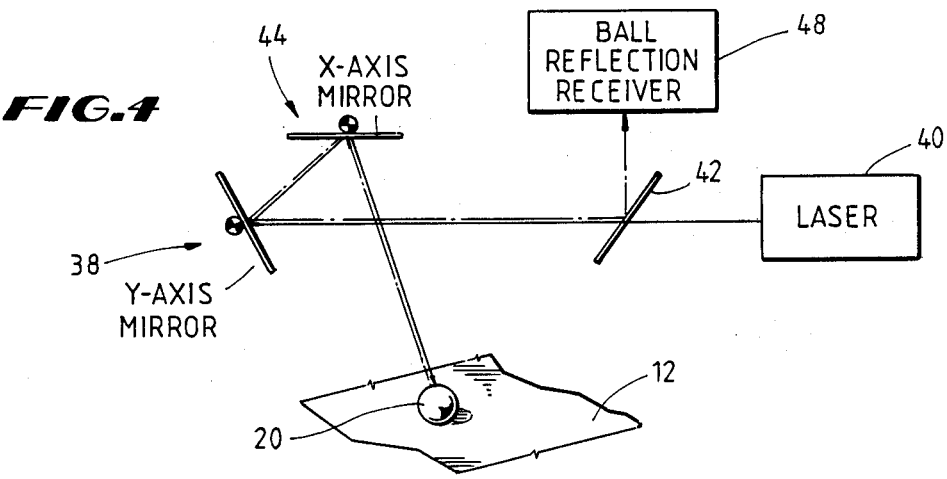
FIG. 4 is a partial isometric view and block diagram showing the ball-tracking means according to the present invention.

Referring now to FIGS. 2 and 4, when the play is to begin, the computer 32 generates a signal directing the unit to scan the playing surface 13 of the pool table 12 in order to precisely locate the position of each of the object balls 14 and the cue ball 20. Previously, the computer has been programmed to break the playing surface 13 into a grid-coordinate system defined by coordinates along X and Y axes. The location, by coordinates, of each of the side pockets 16 may also be programmed into computer 32. The signal generated by the computer 32 is directed through an input/output interface module 30 and thereafter converted by interface 34 into a signal directing the X axis and Y axis units 36, 46 to scan the playing surface 13 of the pool table 12.

As indicated above, stepping motors and step encoders are used to direct high quality reflective surfaces 38 and 44 in accordance with instructions generated by computer 32.

The motors used are simple stepping motors with an absolute reference encoder attached to the rear shaft thereof. Attached to the front shaft is the high quality reflective surface. The computer 32 will check the current location of each reflective surface 38 and 44 by reading a line from each encoder and instructing the stepping motors to move the reflective surfaces in the desired direction. As indicated above, in the most preferred embodiment of the present invention, the X axis and Y axis unit encoders will preferably be 24,000-step encoders attached to the back of 24,000-step per rotation stepping motors.

Still referring to FIGS. 2 and 4, a low watt laser generator 40 projects a laser beam through the nonreflective surface of a one-way mirror 42 when the appropriate signal is generated by the computer 32. The laser beam is projected through the non-reflective surface of the one-way mirror 42 and is reflected off of the reflective surfaces 44 and 38 attached to the Y axis unit 46 and X axis unit 36 to the playing surface 13 of the pool table 12.

The computer 32 will be programmed to direct the X axis unit and Y axis unit to project the laser beam onto the surface 13 of the pool table 12 to follow the grid pattern 21 shown generally in FIG. 5. By tracing out the pattern indicated in FIG. 5, the unit 22 will quickly determine the location of each ball on the playing surface 13.

If a ball 14 is in the path of the laser beam projected from the laser generator 40, a portion of the beam will be reflected back toward the unit 22. The portion of the beam that is reflected directly back toward the unit will be reflected off of the reflective surface 38 and 44 attached to the X axis and Y axis units 36 and 46, respectively. Thereafter, the beam will be directed toward the laser generator 40 but will be reflected by the reflective surface of the one-way mirror 42 to generate a signal in the light-receiving unit 48. The signal generated by the light-receiving unit 48 is transmitted back to the computer 32 after being converted into a digital signal by the interface 34 and amplified by the I/O unit 30. In this manner, the computer 32 will quickly and accurately determine the coordinate position of each object ball 14 and the cue ball 20.

As will be familiar to those skilled in the art, there are many means whereby the portions of the laser beam reflected from the various object balls 14 and cue ball 20 may be used to differentiate the various object balls and the object ball from the cue ball. In one embodiment of the invention, while in the instructional mode, it is not necessary that the unit 22 itself differentiate the various object balls 14 and cue ball 20 as the player/student will designate in the touch-sensitive computer screen 26 which ball represents the cue ball 20 and which ball is to be treated as the designated object ball 15; thereby eliminating the need to automatically differentiate among the various balls 14 on the playing surface 13.

The theory behind finding an object, and particularly a pool ball, by laser reflection will be well-known by those skilled in the art. However, for the sake of explanation, the following example is presented. A laser beam generator 40 projects a laser beam through the nonreflective surface of one-way mirror 42. This beam is in turn reflected by the reflective surfaces of mirrors 44 and 38 onto the playing surface 13 of the pool table 12. Thereafter, the steppig motors attached to the X axis unit and Y axis unit 36 and 46 will direct the projected beam along a predetermined path as shown in FIG. 5. When the laser beam strikes an object ball 14, a beam will initially be reflected in a multitude of directions and not back at the unit 22. However, when the computer finally directs the stepping motors attached to the X axis unit 36 and the Y axis unit 46 to direct the projected laser beam to a point where it is directed toward the center of an object ball 14 or a cue ball 20, the projected beam will be reflected directly back toward the reflective surfaces 38 and 44. The reflected laser beam will be instantly directed toward the reflective surface of the one-way mirror 42 by mirrors 38 and 44. Instantaneously, the reflected laser beam will be directed toward the light-receivng unit 48 and a message will be directed toward the computer 32, indicating that the laser beam has been reflected off of an object ball 14. Thereafter, the computer 32 very quickly calculates the exact location of the found object ball 14 from the information generated by the encoding units attached to the back of each stepping motor provided in the X axis unit 36 and Y axis unit 46. This procedure is followed until the projected laser beam has traced the path shown in FIG. 5 along the entire length of the playing surface 13 of the pool table 12. In this manner, the position of each object ball 14 and the cue ball 20 will be accurately determined.

In accordance with an alternate embodiment of the invention, a video-based system may be used to track the position of the pool balls and record ball movement. The video-based system will also be capable of projecting optimum ball path lines on the playing surface 13 of the table 12. The video-based technology necessary to accomplish this unique use is well known by those skilled in the art, and need not be described here.

Referring now specifically to FIG. 1, the previously described system may also be used to direct a projected laser beam to project images corresponding to lines 17 and region 18, directly onto the playing surface 13 of a pool table 12. This may be done to instruct a player once a particular object ball 15 and side pocket 19 have been designated by the player on the touch-sensitive computer screen 26.

Referring now to FIGS. 1, 2, 4, and 5, in the most preferred embodiment, once the computer 32 has directed the X axis unit 36 and Y axis unit 46 to direct the reflected, projected laser beam along the entire length of the playing surface 13 of the pool table 12, each ball location will have been calculated by the computer 32. The ball locations in the form of ball images are then sent to the controller screen 26 and are displayed on the touch-sensitive screen 26. The computer 32 is now aware of the location of the balls 14, 20 on the playing surface 13 of the table 12, and of the location of each of the side pockets 16, 19.

Thereafter, and still referring to FIGS. 1, 2, 4, and 5, the player will touch the screen 26 to indicate cue ball 20, the designated object ball 15, and the path of the selected shot, including use of side rails 11 if desired. This procedure will be followed whether the system 22 is in either the instructional or competitive mode. In the instructional mode, the computer 32 will calculate (through the use of known simple physics calculations) the path that the cue ball must take in order to strike the designated object ball 15 at the optimum location on the object ball 15 to force the object ball 15 to the designated pocket 19. In the instructional mode, the computer will instruct X axis unit 36 and Y axis unit 46 to reflect a projected laser beam onto the playing surface 13 of the pool table 12 in order to project the proper line that the cue ball 20 must follow in order to strike the designated object ball 15 at the proper location on the object ball 15 in order to pocket the object ball 15 in the designated pocket 19.

Alternatively, in the competitive mode, once the player has "called his shot" by touching the image of the cue ball 20 and designated object ball 15 on the touch-sensitive screen 26 (again including rails 11 if required), the computer will calculate a value according to the difficulty of the shot. The value may be used to subsequently rate the ability of competing players.

Because the computer has calculated the location of the designated pocket to which the player would like to direct the selected object ball 15, simple physics calculations will be made by the computer to determine exactly where the player must strike the object ball with the cue ball in order to pocket the ball (in a manner completely similar to the method used in the instructional mode). In order to assign a level of difficulty for the shot, the maximum error angle is calculated by the computer 32. For example, the computer 32 might take the reciprocal of the maximum error angle and multiply it by 100 to provide a score representing the difficulty of the shot. As indicated above, the maximum error angle is the angle prescribed by the extreme, opposed lines of attack which a cue ball may take in order to still strike the designated object ball 15 and pocket it in the designated side pocket 19. Accordingly, if the distance between cue ball and designated object ball 15 is great, or if use of side rails 11 has also been designated, the computer 32 may factor an even greater score to represent the increased difficulty of the called shot.

In one alternative embodiment of the present invention, the computer will direct the X axis unit 36 and Y axis unit 46 to direct a projected laser beam onto the playing surface 13 of the pool table 12 to outline the path of the balls according to the shot called by the player. Thus, even in the competitive mode, the paths of ball movement may be projected onto the playing surface 13 of the pool table 12 in order to show spectators of the match the shot which one of the competing players has just called. Thus, the unit 22 would show the path of the shot about to be performed and will also show the associated score for the shot on the screen 26.

This score will be added or deducted from the player's running total, depending upon whether the shot is made or missed.

Figure 3:
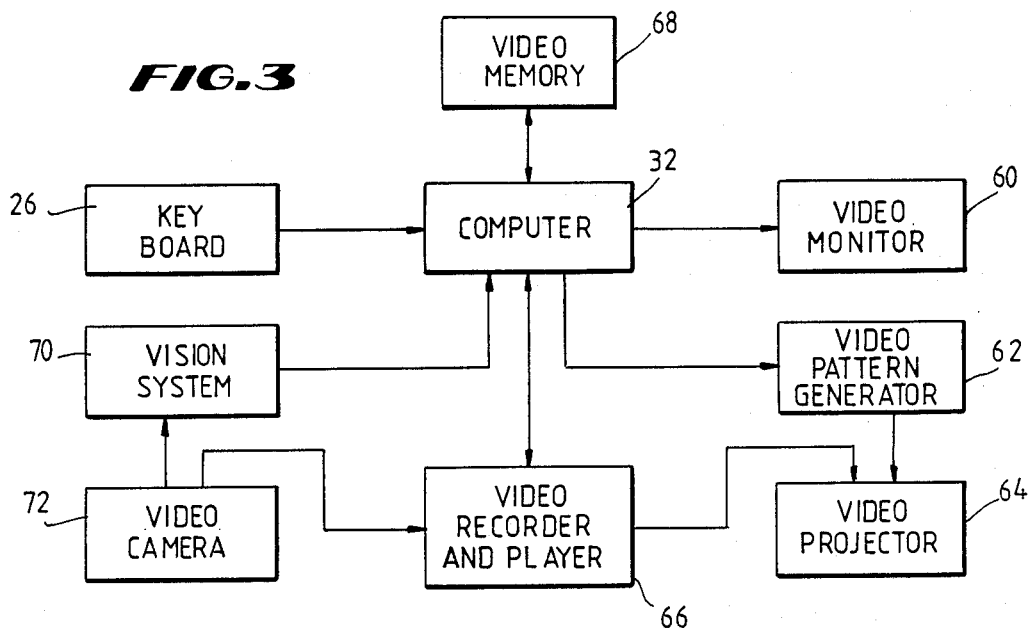
FIG. 3 is a block diagram showing additional components used in the most preferred embodiment of the present invention.

Referring now to FIG. 3, alternative, additional components of the system 22 are shown in block diagram form. When using this preferred embodiment of the system disclosed herein, an entire sequence of play may be recorded and thereafter projected back onto the playing surface 13 of the pool table 12 or directed to be displayed onto the touch-sensitive computer screen 26. Thus, in accordance with this embodiment of the present invention, the entire match, or merely a series of shots, may be recorded and replayed at the desire of the players.

In this embodiment, a keyboard, or preferably touch-sensitive computer screen 26, is used to instruct the computer 32 to record the upcoming match or series of shots. Thereafter, the computer 32 directs video recorder/player 66 and video camera 72 to record the following events. The subsequent shots are either stored on cassette tape by the video recorder/player 66 or are alternatively stored in digital memory by a video memory unit 68. The shots may simultaneously be displayed on a separate video monitor 60 at the direction of the computer 32. Video pattern generator 62 is used to generate the images of the object balls and cue ball on the playing surface 13 of the pool table 12 as the computer 32 orders the X axis and Y axis units to continuously and instantaneously scan the playing surface 13 of the pool table 12 while play is commenced and shots are completed. In this manner, the ongoing play of competing players may be simultaneously displayed on a television screen or, alternatively, on a computer video screen depending upon which variation of the present invention is used.

In a completely similar manner, the play of a learning pool player may be recorded in order to be played back later to help instruct the learning player.

Referring still to FIG. 3, if the competing players wish to replay a particular sequence of shots, or if the players wish to replay the entire match, the computer 32 will be so directed. The computer 32 thereafter directs video pattern generator to display the preceding series of shots on the computer screen 26; or, in the alternative, will direct the video recorder/player 66 to play the preceding series of shots through the video projector 64.

Having now completely disclosed the invention and its preferred embodiments, we now claim:

1. A billiard ball tracking system, comprising:
a billiards table, cue ball, and object balls;
scanning means for scanning a playing surface of the table to determine positions of the cue ball and the object balls;
position indicating means for indicating an initial position of the cue ball and object balls on the table; and
shot indicating means for indicating a selected shot, the shot indicating means illustrating on the table an ideal path of the cue ball for striking an object ball during the shot.

2. The billiard ball tracking system of claim 1, further including:
recording means for recording movement of the cue ball and object balls during a shot; and
playback means for replaying the recorded movement of the cue ball and object balls.

3. The billiard ball tracking system of claim 1, further including a controller coupled to the scanning means, the position indicating means and the shot indicating means.

4. A ball tracking system for use in tracking the position of pool balls on a pool table and calculating ball movement paths given designated pool shots, comprising:
a standard pool table having six pockets provided about the periphery of the table;
a plurality of pool balls;
a cue ball;
a low wattage laser generator used to generate a laser beam;
directing means to variably direct said generated laser beam to a playing surface of said pool table;
a computer coupled to said directing means to variably direct said laser beam, said computer operative to cause said laser beam to scan said playing surface of said table in a grid;
light receiving means to receive said low wattage laser beam when it is reflected back toward said laser generator and generate a signal to said computer to indicate that the laser beam has been reflected back to said system;
position indicating means, adapted to provide signals to said computer to indicate the position of said laser beam on said playing surface of said table;
wherein said computer is programmed to interpret said signals provided by said position indicating means to accurately and continuously determine the variable position of said laser beam as it contacts said playing surface of said table; said position being determined by said computer according to a programmed grid coordinate system;
wherein said computer receives said signals from said position indicating means and said signals generated from said light receiving means to accurately determine the location of each said ball on the playing surface of said table, according to said grid-coordinate system;
touch-sensitive display means to receive signals produced by said computer and display an image corresponding to said playing surface of said table and the location of each ball on the playing surface on a touch-sensitive screen;
said touch-sensitive display means capable of generating and transmitting signals to said computer when a player touches said screen to indicate a pool shot, and to indicate said cue ball, an object ball, and pocket selected by said player;
wherein said computer calculates the optimum path that said cue ball must follow in order to pocket said selected object ball in said selected pocket;
and wherein said computer thereafter directs said means to variably direct said laser beam to direct said laser beam so as to project an image on said playing surface of said pool table corresponding to said optimum path.

5. A method of rating the difficulty of a pool shot, comprising the steps of:
scanning the playing surface of a pool table to determine the location of pool balls on the surface;
designating a desired shot by identifying a cue ball, a target ball, and a specific pocket provided in said table;
calculating the ideal path of travel of said cue ball so that said cue ball, when struck with a cue stick, contacts said target ball to pocket said target ball in said specific pocket;

calculating the range of paths said cue ball may take to strike said target ball so as to pocket said target ball in said pocket;

calculating the difficulty of the designated shot based upon said range and assessing a point value according to said difficulty;

projecting the ideal cue ball path, and path said target ball must take to be pocketed, on said playing surface of said pool table;

striking said cue ball with a cue stick to attempt to pocket said target ball in the designated specific pocket; and scanning said playing surface a second time to determine the new location of said pool balls and to determine if said target ball has been pocketed.

6. The method according to claim 5, including the step of awarding points to a player's score if said specific target ball is pocketed according to said designated shot, and deducting points from a player's score if said specific target ball is not pocketed.

7. The method according to claim 5 wherein said scanning is accomplished by a laser scanner which scans said playing surface of said table in a grid pattern to determine said position of said balls.

8. The method according to claim 5 wherein said scanning is accomplished by a video system which views and records the position of said balls.

* * * * *